(12) United States Patent
Kittaka et al.

(10) Patent No.: US 8,749,663 B2
(45) Date of Patent: Jun. 10, 2014

(54) IMAGE SENSING DEVICE

(75) Inventors: Ryohei Kittaka, Yokohama (JP);
Akihiro Musha, Yokohama (JP);
Hiroyuki Tarumizu, Yokohama (JP);
Teruo Hoshi, Hitachinaka (JP); Satoshi Nidaira, Hitachinaka (JP); Akinori Shiozawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 357 days.

(21) Appl. No.: 13/213,221

(22) Filed: Aug. 19, 2011

(65) Prior Publication Data

US 2012/0057060 A1 Mar. 8, 2012

(30) Foreign Application Priority Data

Sep. 3, 2010 (JP) .................................. 2010-197254

(51) Int. Cl.
*H04N 9/73* (2006.01)

(52) U.S. Cl.
USPC ..................... 348/226.1; 348/228.1

(58) Field of Classification Search
USPC ..................... 348/226.1, 228.1, 302
See application file for complete search history.

(56) References Cited

U.S. PATENT DOCUMENTS

| 5,293,238 | A | 3/1994 | Nakano et al. |  |
| 6,710,818 | B1 * | 3/2004 | Kasahara et al. | 348/226.1 |
| 2004/0201729 | A1 | 10/2004 | Poplin et al. |  |
| 2011/0255786 | A1 * | 10/2011 | Hunter | 382/190 |
| 2012/0081569 | A1 * | 4/2012 | Yost et al. | 348/226.1 |

FOREIGN PATENT DOCUMENTS

| JP | 4-373365 | 12/1992 |  |
| JP | 2003-274278 | 9/2003 |  |
| JP | 2004-260574 | 9/2004 |  |
| JP | 2006-332917 | 12/2006 |  |
| JP | 2006332917 A * | 12/2006 | .............. H04N 5/235 |

OTHER PUBLICATIONS

Japanese Office Action for Japanese Patent Application No. 2010-197254, issued on Dec. 11, 2012.
JP Office Action for Japanese Patent Application No. 2010-197254, issued on Feb. 26, 2013.
Chinese Office Action for Chinese Application No. 201110230917.7, issued on Nov. 4, 2013.

\* cited by examiner

*Primary Examiner* — Nhan T Tran
(74) *Attorney, Agent, or Firm* — Antonelli, Terry, Stout & Kraus, LLP.

(57) ABSTRACT

In order to stably detect a flicker under an illumination of a fluorescent lamp with an XY-addressed-scanning type image sensor used and to cancel the flicker, the present invention provides an image sensing device, wherein a video signal in any area on an imaging plane is first integrated per frame period, then an integrated value in a current frame is sequentially compared with a one-frame previously integrated value, next whether a variation pattern of the integrated value matches one of flicker patterns when the flicker occurs is determined, then an existence of the flicker is determined when an identical flicker pattern is seen more than two consecutive times.

4 Claims, 3 Drawing Sheets

IMAGE SENSING DEVICE

CROSS REFERENCE TO RELATED ART

The present patent application claims the benefit under 35 U.S.C. 119 of Japanese Patent Application No. 2010-197254 on Sep. 3, 2010, the disclosure of which is incorporated into this patent application by reference.

BACKGROUND OF THE INVENTION

1. Technical Field

The present invention relates to an image sensing device, comprising a detection means of a fluorescent lamp flicker under an illumination of a flickering light source such as the fluorescent lamp, in an XY-addressed-scanning type image sensor, for example, a CMOS image sensor.

2. Background Art

In a case where an object is imaged by a video-camera under an illumination of a fluorescent lamp directly lit on a commercial power source, a periodical brightness change, so called a fluorescent lamp flicker, is seen in a video signal of imaging output, due to a difference between a brightness variation period of the fluorescent lamp (an invert of a double the commercial power source frequency) and a vertical synchronization period of the video-camera, unless an exposure time is set to the brightness variation period of the fluorescent lamp multiplied by an integer. Particularly, in a case of an XY-addressed-scanning type image sensor such as a CMOS image sensor being used, the flicker is observed on an imaging plane as striped patterns due to a vertically periodical variation of a brightness intensity level or a hue, because the exposure timing is different between horizontal lines.

Here, strictly speaking, with the XY-addressed-scanning type image sensor such as the CMOS image sensor being used, the exposure timing per each pixel is sequentially shifted by a period of a read-out clock (pixel clock) from one pixel to its adjacent one, on each horizontal scanning line on the imaging plane. Even in case to assume that all of in-line pixels have the simultaneous exposure timing, no substantial problem is caused, although the exposure timings in all pixels are different. This is because a scanning time for a horizontal line is much shorter than the intensity variation period of the fluorescent lamp.

As a technique and method, to remove the flicker portion from the imaging plane signal, a shutter correction method to make corrections based on a relation between a shutter speed and a flicker level, and a gain correction method to put an inverted waveform of a detected flicker waveform onto the video signal as a correction gain, are principally known.

As an example of the shutter correction method, JP Publication H04-373365 describes a method to integrate a video signal for a one-field period using an integration circuit, to store the signal for the one-field period at shortest, then to sequentially compare a current input signal with a one-field previous input signal from the integration circuit, subsequently to detect the flicker by determining an existence of a regularity, and to control the shutter speed.

DESCRIPTION OF THE RELATED ART

However, as described in Japanese application JP Publication H04-373365, the method to sequentially compare the current input signal with the one-field previous input signal from the integration circuit and to determine the existence of the regularity, has a possibility not to detect the flicker appropriately. This is because the result of comparing the current input signal and the one-field previous signal, coincidentally has a possibility to match the regularity when the flicker occurs under an illumination of a non-fluorescent lamp, in a case where the video signal varies due to a non-fluorescent-lamp causes such as a dynamic body as an object, or has a possibility not to match the regularity under an illumination of the fluorescent lamp.

Meanwhile, in case of CCD image sensor, because all pixels on one imaging plane are exposed in an identical exposure timing, the brightness variation and the hue variation due to the flicker is seen only between the frames. Therefore, because a larger integration area on the imaging plane makes a larger variation of the integrated value between frames, the influence of the dynamic object or the noise given to the determination accuracy in the method of determining the existence of the regularity, can be reduced.

However, in case of the CMOS image sensor, pixels are exposed in the different timing per each horizontal line, and consequently, when the each exposure timing is deemed identical, the larger integration area makes the less influence of the dynamic object or the noise. However, as long as the each exposure timing is not deemed identical, the variation of the integrated value between frames is not a big amount even with a large integration area taken, and the effect to reduce the influence of the dynamic object or the noise is limited.

Therefore, an object of the present invention is to realize an image sensing device and a function to stably detect a flicker without mis-detecting and to cancel the flicker, with the CMOS image sensor used, even in case of the dynamic body as the object or a highly noisy case (low-light video or the like).

Incidentally, numerous objects and advantages other than the aforementioned will become more apparent, by reference to the description or drawing of the present invention.

SUMMARY OF THE INVENTION

An image sensing device of the present invention integrates video signals within any area in the imaging plane per frame period, sequentially compares the integrated value in the current frame with that in a one-frame previous frame, determines whether or not the variation pattern of the integrated value matches one of the flicker patterns when the flicker occurs, then determines the existence of the flicker when the identical flicker pattern is seen more than two consecutive times. And it is preferred to perform the determination at a plurality of locations on the imaging plane to determine the existence of the flicker, when the number of the locations of the existence of the flicker is more than a half of the total number of determination. A signal storage time of the image sensor is controlled to cancel the flicker, when the existence of the flicker is determined.

Incidentally, the aforementioned configuration shows just an example and appropriate modifications are possible to the invention, without departing from the spirit of this invention. Furthermore, the various embodiments of the present invention other than the aforementioned will become apparent, by reference to the entire description or drawings of the application.

With the present invention, flickers are stably detected without any substantial problem, and the flickers can be cancelled by controlling a storage time of a video signal dependent on the existence of the flickers, even in case of a dynamic object or a highly noisy case (low-light video or the like) with the CMOS image sensors used.

BEST MODE FOR CARRYING OUT THE INVENTION

Embodiments of the present invention will be explained with reference to drawings. Incidentally, an identical sign will be put on each of the identical or similar configuration elements in each drawing and each embodiment, to omit the further explanation.

Figure 1:
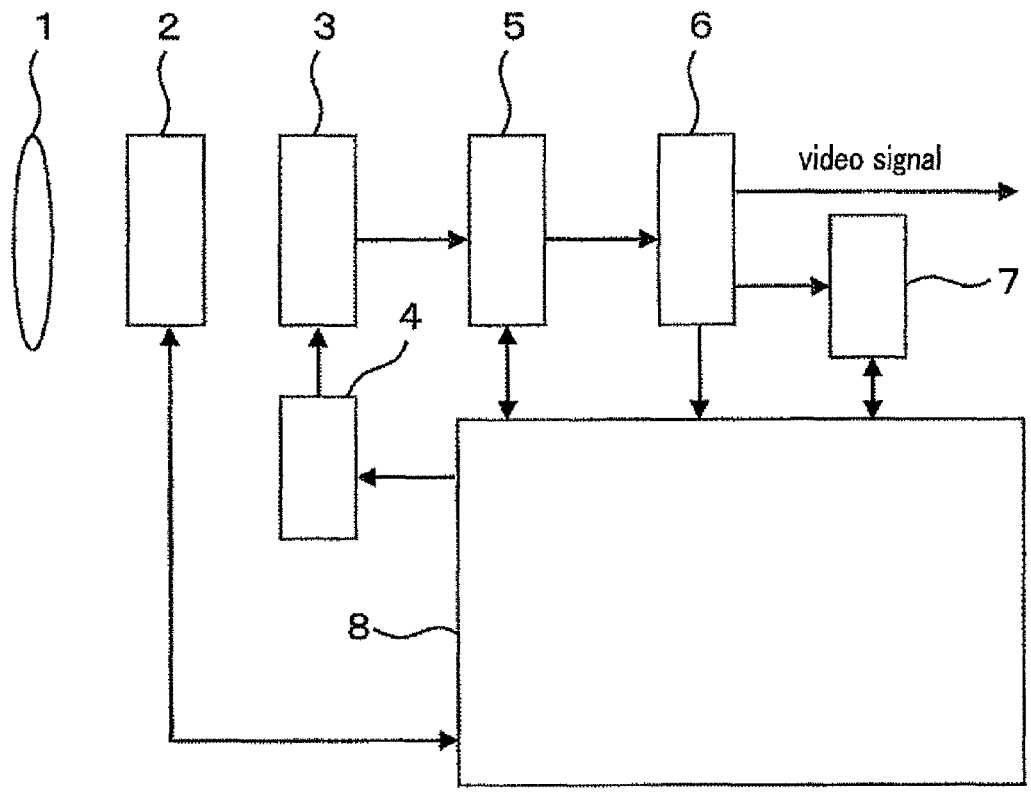
FIG. 1 is a block diagram showing an embodiment of the present invention.

FIG. 1 is a block diagram showing an embodiment of the present invention. Light incident through lens 1 is regulated in light amount by a diaphragm 2 and converted into an electrical signal by a CMOS image sensor 3. The electric signal is passed through an AGC circuit 5 and processed by a signal processing circuit 6 an output of which is a video signal (luminance signal). The video signal from the signal processing circuit 6 is also input to an integration circuit (integrator) 7 and also to a microcomputer (controller) 8. Here, the CMOS image sensor 3 has a signal storage time which is adjustable by an electronic shutter speed control circuit (electronic shutter speed controller) 4. The microcomputer 8 controls the diaphragm 2 and a gain of the AGC circuit 5 on the basis of the signal input from the signal processing circuit 6 so that a level of the signal input to the CMOS image sensor 3 and to the signal processing circuit 6 can become optimum. A value of the diaphragm 2 is detected by a diaphragm value detection circuit and input to the microcomputer 8. Further, the microcomputer 8 outputs a signal by which the signal storage time is made variable, to an electronic shutter speed control circuit 4.

Here, the integration circuit 7 functions to integrate the input signal (video signal) for each frame period, and output a result (integrated value). An integration area (integration domain) is possible to be set in any area (domain) on the imaging plane by the microcomputer 8. Only one integration domain may be set at one location on the imaging plane and a plurality of integration domains may be set at various locations on the imaging plane and the integrated value is possible to be independently calculated per each domain. Further, even in case of setting a plurality of the locations as the integration domains, a single integration circuit 7 can process integrations for all domains or a plurality of the integration circuits 7 can be comprised.

Figure 2:
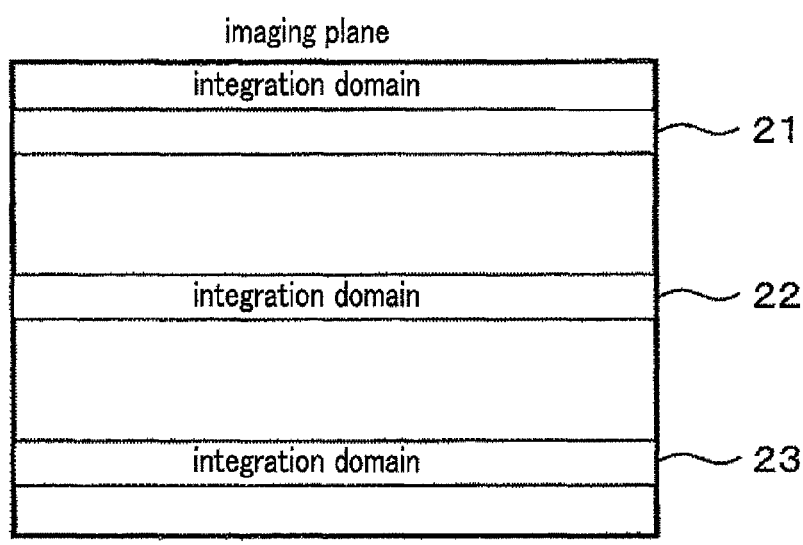
FIG. 2 is a chart explaining an integrated domain of an embodiment of the present invention.

Subsequently, as shown on FIG. 2, integration domains 21, 22, and 23 are set for the integration circuits 7 through microcomputer 8. Here, it's preferred to set each of the integration domains 21, 22, and 23 as large as possible, as long as the exposure timing may be deemed identical within each of the integration domains. However, a flicker detection is not restricted with this, but possible, even out of the extent that the exposure timing is deemed identical. If the domain becomes so large that the exposure timing is not deemed identical, there are cases in which the domain has such a number of lines that the integrated value of each of the lines in the domain for the current frame becomes necessarily equal to that of one of the lines in the domain for the previous frame, assuming the exposure time is constant. Therefore, the integrated value over the entire integration domain is always constant even when the flicker occurs, and flickers can not be detected. Thus, the domain needs to have not such a number of lines.

For example, in this embodiment assuming 720 lines on the imaging plane and 1 frame duration of 1/60 second, it's preferred to set one integration domain to around 15 lines. Incidentally, when the domain has around 15 lines, the exposure timing is not deemed identical over the domain. However, a susceptibility to the noise and the like becomes less. This is because the number of the lines in the integration domain is more than that in case when the integration domain has several lines. However, one integration domain may be set to have one or a few lines. Furthermore, the advantage of less susceptibility to the noise and the like is expected, when one integration domain has a plurality of lines rather than one single line.

Figure 3:
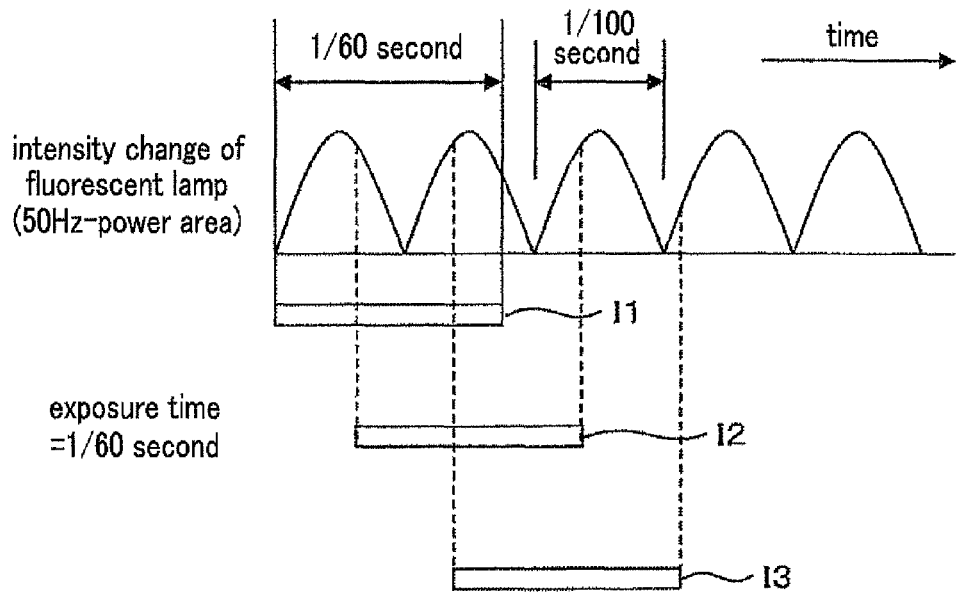
FIG. 3 is a timing chart explaining the flicker determination location of an embodiment of the present invention.

As shown in FIG. 3, the integration domains 21, 22, and 23 are disposed in such a manner that the exposure start timing of each of the integration domains 21, 22, and 23 is different from at least one of exposure timings of the other domains (preferably different from each exposure timing of each domain), and that the integration domains on the imaging plane are not overlapped each other and are at vertically isolated locations. This improves the flicker detection accuracy, because of the existence of a plurality of flicker patterns mentioned below. Here, the locations of the integration domains 21, 22 and 23 are preferred to be scattered on the imaging plane. This makes the capability to detect flickers, even if flickers occur, for example, only in the upper part of the imaging plane. In addition, the possibility of mis-determination is reduced by increasing the number of integration domains and subsequently increasing the number of the determination locations, although the setting of one single integration domain is allowed.

Figure 4:
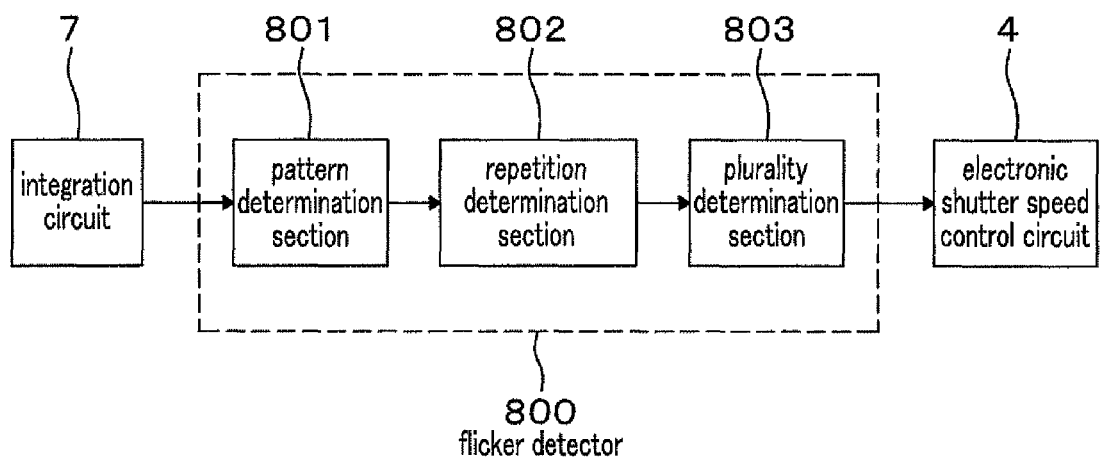
FIG. 4 is a block diagram showing a flicker detection algorithm of the present invention.
Figure 5:
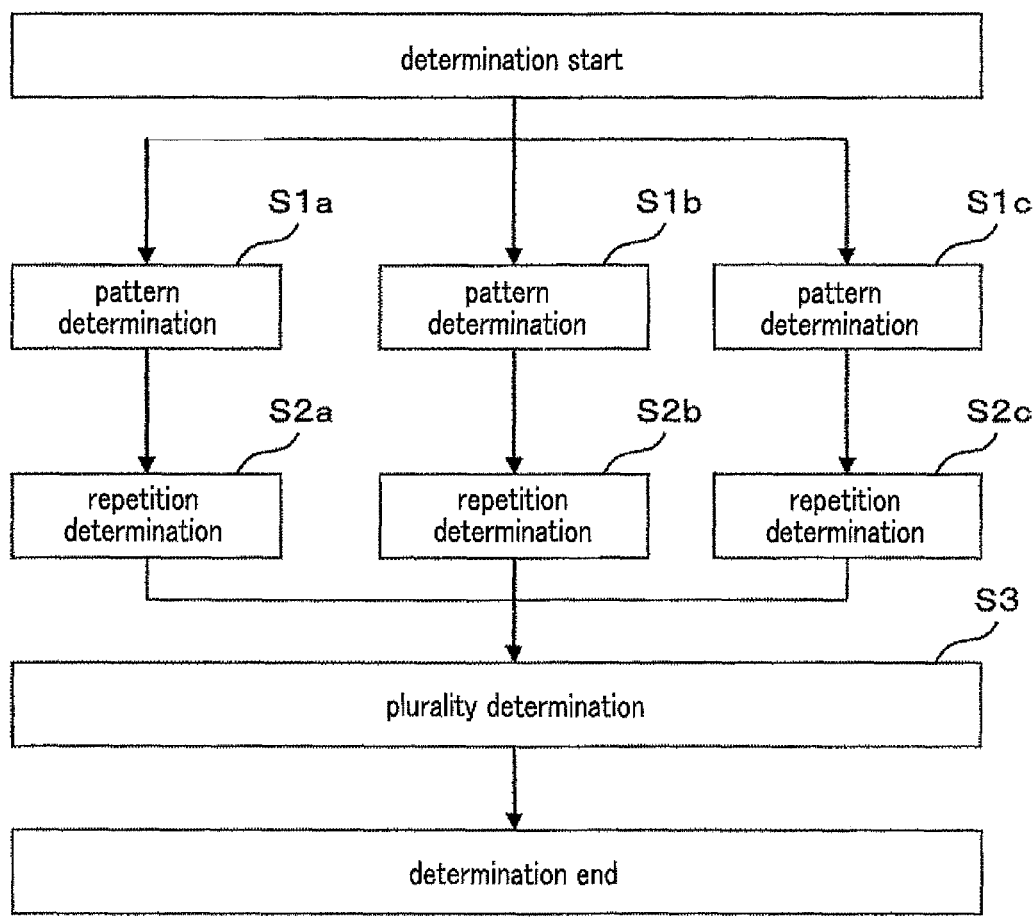
FIG. 5 is a flowchart showing a determination flow of a flicker detection algorithm of the present invention.

A flicker detection algorithm in an embodiment of the present invention shown on FIG. 1 is explained on the block diagram of FIG. 4 and the flowchart of FIG. 5.

The flicker detector 800 comprises a pattern determination section 801, a repetition determination section 802 and a plurality determination section 803. The flicker detector 800 is implemented by microcomputer 8.

First, an integration circuit 7 inputs an integrated value per one frame for each of integration domains, to the pattern determination section 801. The pattern determination section 801 stores the integrated value input at least for a one-frame period, compares the current integrated value with a one-frame previously integrated value, and determines whether the integration value for the domain increases, decreases, or remains unchanged (no change) by a calculation compared with the one-frame previously integrated value. Here, a predetermined threshold is used to determine between an increase, a decrease, and no change. If the change amount is less than or equal to the predetermined threshold, the integration value is determined to be no change. Then, the calculation results (alternatively, variation patterns) are stored for a several-frame period.

Further, the pattern determination section 801 determines whether or not the variation pattern of the integrated value over a predetermined number of consecutive frames (here, the predetermined frame count is identical with a flicker period) matches one of the flicker patterns, which are variation patterns of the integrated value when the fluorescent lamp flicker occurs.

When the flicker occurs, the variation pattern of the integrated value calculated above has a characteristic to match one of a plurality of the predetermined flicker patterns and to be detected repeatedly at a constant interval of a flicker period. For example, when the exposure starts at a timing of the intensity variation of the florescent lamp becoming a bottom as is the case with the integration domain 21 in FIG. 3, a variation pattern of the integrated value over frames in accordance with a fixed pattern of an exposure timing I1 of the integration domain 21 repeatedly varies and repeatedly occurs a variation pattern of decrease (less brightness than that in the previous frame)>increase (more brightness than that in the previous frame)>no change (identical brightness as that in the previous frame) in a 3-frame period. The 3-frame periods correspond to a flicker period of the flicker pattern. For example, in case of NTSC (1 frame duration of 1/60 second), the flickering period of the fluorescent lamp of 1/100 second, the peak timings of the variation of the fluorescent lamp are matched every three frames and the bottom timings of the variation of the fluorescent lamp are also matched every three frames. (This is because the exposure timing to the intensity variation of the fluorescent lamp in the current frame matches the 3-frame previous exposure timing). Other flicker patterns exist such as increase>increase>decrease, decrease>decrease>increase, and increase>decrease>no change, 4 patterns in total. Incidentally, in case of PAL (1 frame duration of 1/50 second) and the power source of 60 Hz, the flicker period of the flicker pattern is 5 frames.

Here, on FIG. 3, exposure timings 12 and 13 show the exposure timings of integration domains 22 and 23, respectively. When the flicker occurs, the variation pattern in each domain also matches one of a plurality of predetermined flicker patterns.

Then, in case of a plurality of the integration domains 21, 22 and 23, pattern determinations S1a, S1b, and S1c are performed at each of the determination points (integration domains)

Next, when the pattern determination section 801 determines that the variation pattern of the integrated value matches one of the flicker patterns, if the variation pattern of the integrated value matches the identical flicker pattern at least over the two flicker periods (a plurality of identical flicker patterns occur consecutively), the repetition determination section 802 repetition-determines that the flicker occurs. Then, in case of the plurality of the integration domains 21, 22 and 23, each of the repetition-determination S2a, S2b, and S2c is performed corresponding to each integration domain.

Lastly, the plurality determination section 803 performs the plurality determination S3, using the repetition determination result input from the repetition determination section 802. As a result of the repetition determination at each point (integration domain), when the number of the points to determine that the flicker occurs is more than a half of the number of the total points of determination, the flicker occurring is as a whole determined. Incidentally, the plurality determination section 803 can be omitted, when one single integration domain exists.

Then, when the flicker is detected, the microcomputer 8 cancels the flicker by controlling the electronic shutter speed controller 4 and setting the signal storage time of the CMOS image sensor 3 as the brightness period of the fluorescent lamp multiplied by an integer.

As above, the present invention has been described with reference to specific embodiments, each configuration in the embodiments is just a simple example and appropriate modifications are possible to the invention, without departing from the spirit of this invention. Also, each configuration in the embodiments can be used by combination as far as no conflict exists among each other.

The invention claimed is:

1. An image sensing device which images a picture using an image sensor, comprising:
    an integrator for obtaining a video signal during imaging, integrating the video signal for each of frame periods on any domain in an imaging plane, and calculating integrated values at a plurality of isolated domains spaced apart from each other on the imaging plane, respectively;
    a pattern determination section for obtaining a first signal integrated value for a current frame from the integrator, comparing the first signal integrated value with a second signal integrated value for a previous frame, that occurred one frame before the current frame, determining whether the first signal integrated value increases, decreases, or remains unchanged from the second signal integrated value, and determining in each domain whether a variation pattern including increase, decrease, and no change on a signal integration value for a predetermined number of the previous frames matches one of flicker patterns which are variation patterns including increase, decrease, and no change on the signal integrated value on the predetermined number of the previous frames, when a fluorescent lamp flicker occurs; and
    a repetition determination section for determining that the flicker occurs in each domain, if the pattern determination section determines that the variation pattern matches one of the flicker patterns, and the variation pattern of the integrated value matches an identical flicker pattern at least over two flicker periods,
    wherein the plurality of the domains integrated by the integrator are set at vertically isolated locations spaced apart from each other on the imaging plane, so that the exposure start timing of the image sensor in each domain against the brightness variation of the fluorescent lamp can be different from that at least in one domain.

2. The image sensing device of claim 1, wherein:
    the pattern determination section determines the variation pattern and the repetition determination section determines the existence of the flicker, on the basis of the integrated value in each of the domains, respectively, and
    when the number of the domains of the existence of the flicker determined by the repetition determination section is more than a half of the total number of the domain, the existence of the flicker is determined.

3. The image sensing device of claim 1, wherein the image sensor is an XY-addressed-scanning type image sensor.

4. The image sensing device of claim 1, further comprising a shutter speed controller which cancels the flicker by setting a signal storage time of the image sensor as the brightness period of the fluorescent lamp multiplied by an integer, when the flicker is detected.

* * * * *